United States Patent
Tillotson et al.

(10) Patent No.: US 6,749,826 B2
(45) Date of Patent: Jun. 15, 2004

(54) CARBON NANOTUBE COATINGS AS CHEMICAL ABSORBERS

(75) Inventors: Thomas M. Tillotson, Tracy, CA (US); Brian D. Andresen, Livermore, CA (US); Armando Alcaraz, Fremont, CA (US)

(73) Assignee: The Regents of the University of California, Oakland, CA (US)

( * ) Notice: Subject to any disclaimer, the term of this patent is extended or adjusted under 35 U.S.C. 154(b) by 13 days.

(21) Appl. No.: 10/163,720

(22) Filed: Jun. 5, 2002

(65) Prior Publication Data

US 2002/0192142 A1 Dec. 19, 2002

Related U.S. Application Data

(60) Provisional application No. 60/298,602, filed on Jun. 13, 2001.

(51) Int. Cl.[7] .................................................. D01F 9/12
(52) U.S. Cl. ............................ 423/447.2; 423/447.1; 96/154; 95/141; 502/416; 428/368
(58) Field of Search ..................... 423/447.1, 447.2; 96/154; 95/141; 502/416; 428/368

(56) References Cited

U.S. PATENT DOCUMENTS

| | | | |
|---|---|---|---|
| 5,648,569 A | 7/1997 | Corbin et al. | |
| 5,800,706 A | 9/1998 | Fischer | |
| 5,985,112 A | 11/1999 | Fischer | |
| 6,066,448 A | 5/2000 | Wohlstadter et al. | |

FOREIGN PATENT DOCUMENTS

| | | | |
|---|---|---|---|
| JP | 07185327 | * | 7/1995 |
| JP | 11221414 | * | 8/1999 |
| JP | 2001-030200 | * | 2/2001 |
| WO | WO 97/32571 A1 | | 9/1997 |
| WO | WO 00/01980 A2 | | 1/2000 |
| WO | WO 02 32558 A | | 4/2002 |

OTHER PUBLICATIONS

Abstract, Wada, Satoru et al: "Air Purification Filtering Unit" Database accession No. 131:148448, DATABASE CA, Online!.

Abstract, Zinov'EV, A.P. et al: "Method of Purification of Highly Polluted Water", Database accession No. 136:107110 CA, DATABASE CA Online!.

Richard Q. Long et al: "Carbon Nanotubes as Superior Sorbent for Dioxin Removal", Journal of the American Chemical Society, vol. 123, No. 9, Mar. 7, 2001, pp. 20058–2059, ISSN:0002–7863.

Abstract, Patent Abstracts of Japan, vol. 1995, No. 10, Nov. 30, 1995 & JP 07 185327 A(NEC Corp), Jul. 25, 1995.

* cited by examiner

Primary Examiner—Stuart L. Hendrickson
Assistant Examiner—Peter J Lish
(74) Attorney, Agent, or Firm—Eddie E. Scott; L. E. Carnahan; Alan H. Thompson

(57) ABSTRACT

Airborne or aqueous organic compound collection using carbon nanotubes. Exposure of carbon nanotube-coated disks to controlled atmospheres of chemical warefare (CW)-related compounds provide superior extraction and retention efficiencies compared to commercially available airborne organic compound collectors. For example, the carbon nanotube-coated collectors were four (4) times more efficient toward concentrating dimethylmethyl-phosphonate (DMMP), a CW surrogate, than Carboxen, the optimized carbonized polymer for CW-related vapor collections. In addition to DMMP, the carbon nanotube-coated material possesses high collection efficiencies for the CW-related compounds diisopropylaminoethanol (DIEA), and diisopropylmethylphosphonate (DIMP).

7 Claims, 1 Drawing Sheet

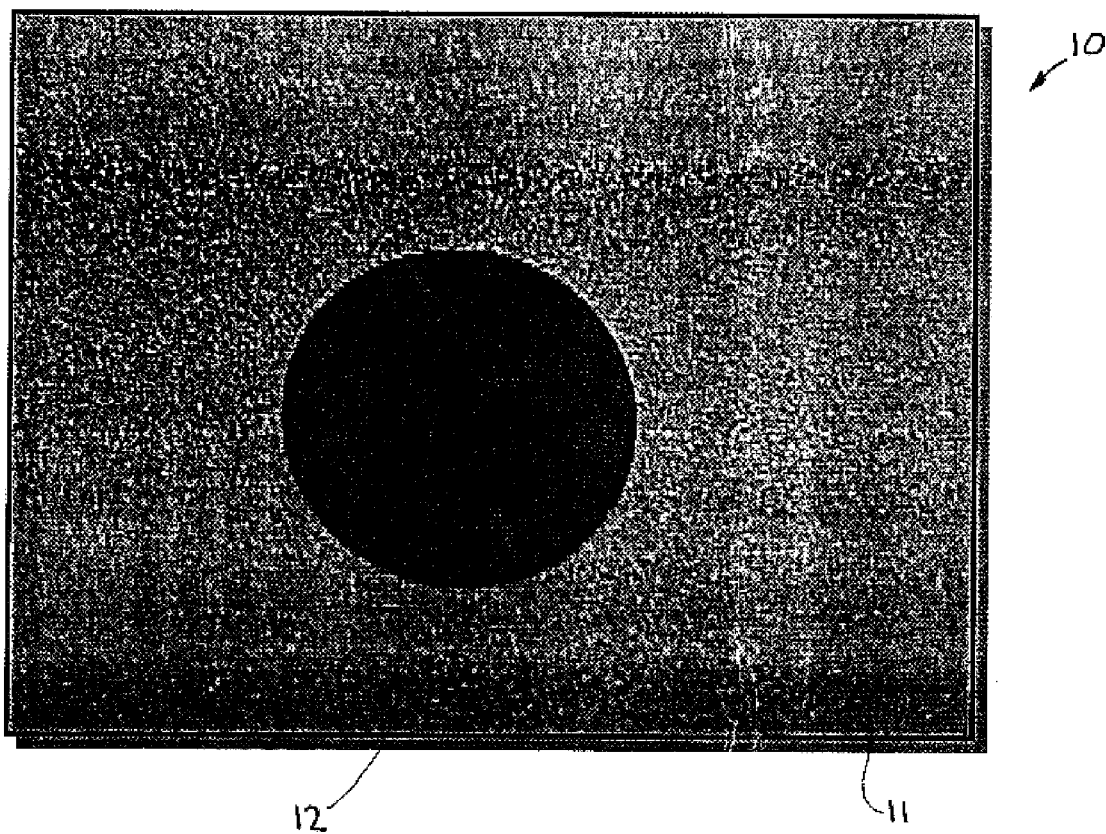

CARBON NANOTUBE COATINGS AS CHEMICAL ABSORBERS

RELATED APPLICATION

This application relates to U.S. Provisional Application No. 60/298,602 filed Jun. 13, 2001, and claims priority thereof.

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to the collection of airborne or aqueous organic compounds, particularly to the collection of chemical warefare (CW)-related compounds, and more particularly to a collector for such organic compounds which is provided with carbon nanotubes whereby extraction and retention efficiencies is greatly increased over conventional airborne or aqueous compound collection approaches.

Since the accidental discovery of carbon nanotubes about a decade ago, carbon nanotubes have displayed a considerable number of unique properties. Researchers have found carbon nanotubes to be stronger and tougher than steel, capable of carrying higher current densities than either copper or superconductors, and able to form transistors only a few nanometers wide. Unlike diamond and graphite, which are both insulators, a remarkable property of carbon nanotubes is their ability to act as either a metal or semiconductor. Applications range from future ultrasmall electronic circuits, to ultrathin CRTs, to bullet proof armor, gas storage, air filter units, etc. In addition, the carbon nanotubes can be doped so as to absorb hydrogen, for example, with a sorption-desorption cycle than can be repeated with little decrease in the sorption capacity.

Derived from spheroidal fullerness ("Buckyballs"), a carbon nanotube is a long and hollow array of hexagonal-pattern carbon atoms. Similar to a single layer of graphite rolled into a tube, carbon nanotubes are typically 2 nm in diameters and several hundred micrometers long.

While carbon nanotubes have been considered for many applications, as pointed out above, little prior effort has been focused on the chemistry of the carbon nanotubes as collectors and concentrators of target compounds in air, water, or waste streams. The present invention is directed to utilizing carbon nanotubes as collectors and concentrators of organic compounds in air, water, or waste streams, particularly CW-related vapor collections and concentrations, such as CW surrogates dimethylmethyl-phosphonate (DMMP), diisopropyl-aminaethanol (DIEA), and diisopropylmethylphosphonate (DIMP).

SUMMARY OF THE INVENTION

It is an object of the present invention to provide carbon nanotube coatings as chemical absorbers.

A further object of the invention is to provide airborne or aqueous organic compound collectors and concentrators utilizing carbon nanotubes.

A further object of the invention is to provide collectors for airborne chemical warefare-related compounds using carbon nanotubes.

Another object of the invention is to provide organic compound collectors having carbon nanotubes.

Another object of the invention is to provide carbon nanotube coatings on an airborne organic compound collector.

Another object of the invention is to provide an airborne collector with a carbon nanotube coating for collecting and concentrating chemical warefare-related organic compounds.

Other objects and advantages of the invention will become apparent from the following description and accompanying drawing. Basically, the present invention involves providing an airborne or aqueous organic compound collector with a coating of carbon nanotubes. Collectors using carbon nanotubes have been shown to be four-ten times more effective toward concentrating a chemical warefare (CW) surrogate than the currently utilized optimized carbonized polymers, such as Carboxen made by Sepelco (Aldridge/Sigma), for CW-related vapor collections.

The carbon nanotubes, as pointed out above, are typically 2 nm in diameter and several hundred micrometers long, and can be coated on a metal substrate, which for example, may be a disc or honeycomb, made of metal, plastic, and ceramics by suspending the nanotubes uniformly in a solvent containing a binder, for example, an oryanosilane such as polydimethylsilane, and then applying such to the substrate via ultrasonic impulses to a spray apparatus. More simply, but less effectively, a substrate, such as a 1 cm metal disk can be uniformly airbrushed with a solution containing the carbon nanotubes. Exposure of the carbon nanotube-coated disks to controlled atmospheres of CW-related compounds revealed very superior extraction and retention efficiencies compared to the currently utilized Carboxen.

BRIEF DESCRIPTION OF THE DRAWINGS

The accompanying drawings, which are incorporated into and form a part of the disclosure, illustrates an embodiment of the invention and test results thereof and, together with the description, serve to explain the principles of the invention.

The single figure is a view of an embodiment of a collector disk with a coating of carbon nanotubes.

DETAILED DESCRIPTION OF THE INVENTION

The present invention is directed to carbon nanotube coatings as chemical absorbers, and particularly for the collection and concentration of chemical warefare (CW)-related airborne organic compounds. A carbon nanotube, derived from spheroidal fullerness ("Buckyballs") is a long and hollow array of hexagonal-pattern carbon atoms. Similar to a single layer of graphite rolled into a tube, the carbon nanotubes are typically 2 nm in diameter and several hundred micrometers long. The carbon nanotubes may be prepared, for example, by applying a direct-current arc discharge (18 to 35V and 100 to 200 Ω), typically from an arc welder, between two graphite electrodes in an inert atmosphere.

To experimentally verify the invention, the previously formed pure carbon nanotubes were then coated on a uniform 1-cm metal disk by two methods. The first method, most simple but least effective, was airbrushed uniformally with a solution of the carbon nanotubes. However, the coatings were not fully uniform. The second method, which was uniformally effective, involved suspending the carbon nanotubes uniformly in a solvent containing polydimethylsilane as a binder, and then applying ultrasonic impulses to the spray apparatus while spray coating 1-cm metal disk.

The drawing illustrates an embodiment of the collector generally indicated at 10 and composed of a substrate or disk 11 coated with carbon nanotube 12. For comparison, we coated a single standardized 1-cm metal disk with an identical weight of Carboxen, a commercially air-filtration medium with very high collection efficiencies that is the optimized carbonized polymer for collecting CW-related vapors.

We then exposed the coated disks to a controlled atmosphere containing three (3) CW surrogates; dimethylmethylphosphonate (DMMP), diisopropylaminoethanol (DIEA), and diisopropylmethylphosphonate (DIMP). To quantitatively measure airborne-collection efficiencies, we used solid-phase microextraction (SPME) and gas-chromatography mass spectrometry (GC-MS) to obtain weight-per-weight comparisons. This clearly established that the carbon nanotube-coated disks possessed high collection efficiencies. In fact, we found that the carbon nanotubes were four (4) times more efficient than Carboxen in extracting, concentrating, and retaining one of the surrogates-DMMP, which is a significant advance in the art.

The GC-MS measurements taken established retention times and identification of the three target compound: DMMP (at 5.7 min.); DIMP (at 9.9 min.) and DIEA (at 9.5 min.) which were collected as fugitive air emissions using carbon nanotube technology. The concentrations of the collected target compounds also far exceeded commercial polymeric materials, such as Carboxen.

It has thus been shown that carbon nanotubes provide another very useful new substrate for the collection of CW-related target compounds associated with airborne weapons of mass destruction (WMD) at dilute concentrations in air samples. The carbon nanotubes function equally well in aqueous samples. Also, when the carbon nanotubes are incorporated in new collection tools, the nanotubes will be potentially very useful in nonproliferation applications. Since the carbon nanotubes-coated materials possess high collection efficiencies, in addition to CW-related compounds, they can be utilized for environmental clean-up, disease state diagnosis, high explosive detection, process control, environment monitoring, and chemical synthesis.

While particular embodiments and fabrication approaches, along with specified materials and parameters have been set forth to exemplify and teach the principals of the invention, such are not intended to be limiting. Modifications and changes may become apparent to those skilled in the art, and it is intended that the invention be limited only by the scope of the appended claims.

What is claimed is:

1. In a collector for collecting and concentrating organic compounds, the improvement comprising:

a carbon nanotube material as the collector, wherein said carbon nanotube material is coated on a support member and wherein said material is coated by uniformly suspending carbon nanotubes in a solvent containing a binder, and spraying the solvent using ultrasonic impulses.

2. The improvement of claim 1, wherein the binder is an organosilane.

3. The improvement of claim 2, wherein said carbon nanotube material is composed of carbon nanotubes having a diameters of about 2 nm and a length of at least one hundred micrometers.

4. The improvement of claim 2, wherein the organosilane is polydimethylsilane.

5. A method for fabricating a carbon nanotube collector for airborne organic compounds, comprising:

providing a quantity of carbon nanotubes, and coating the carbon nanotubes on a substrate, wherein said coating is carried out by spraying a solution containing the carbon nanotubes in a binder using ultrasonic impulses to the spray apparatus, and additionally including uniformly suspending the carbon nanotubes in the binder, wherein the binder is composed of organosilane.

6. The method of claim 5, wherein the organosilane is polydimethylsilane.

7. The method of claim 5, additionally including forming the quantity of carbon nanotubes wherein the carbon nanotubes are formed to have a diameter of about 2 nm and a length of a number of hundred micrometers.

\* \* \* \* \*